Feb. 18, 1964 W. S. MORTLEY 3,121,870
PULSED RADAR SYSTEMS
Filed March 14, 1960 2 Sheets-Sheet 1
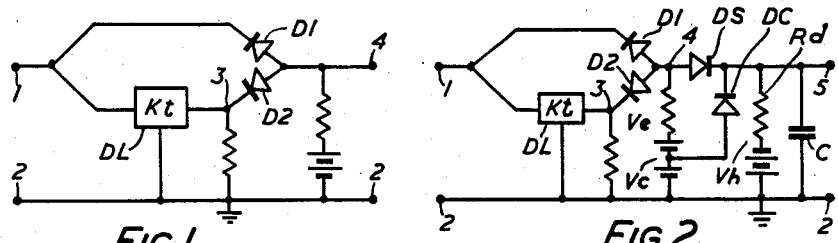
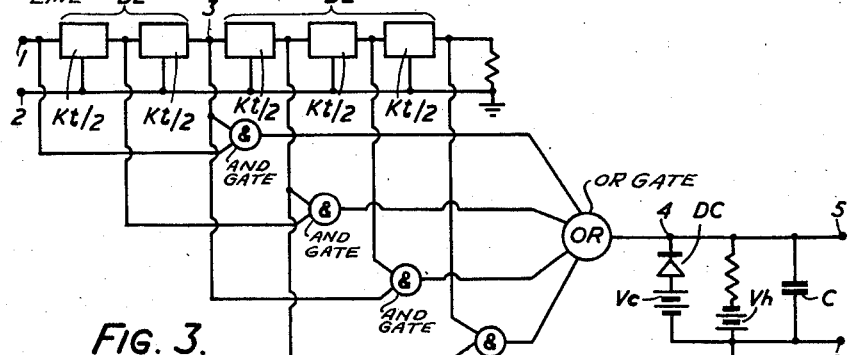
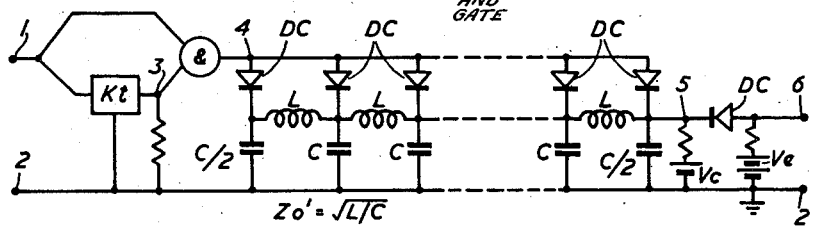
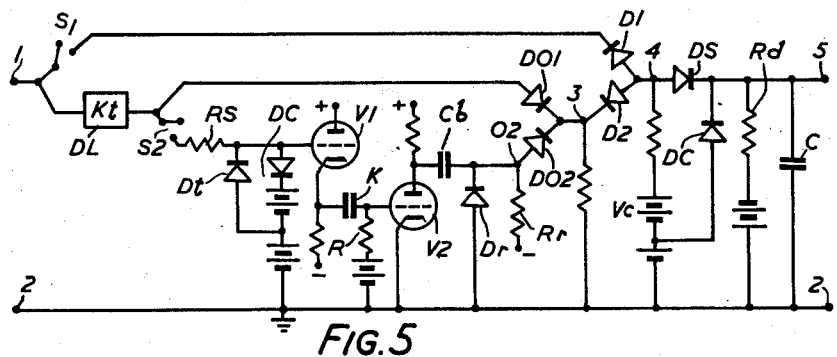
INVENTOR
Wilfrid Sinden Mortley
BY Baldwin & Wight
ATTORNEYS

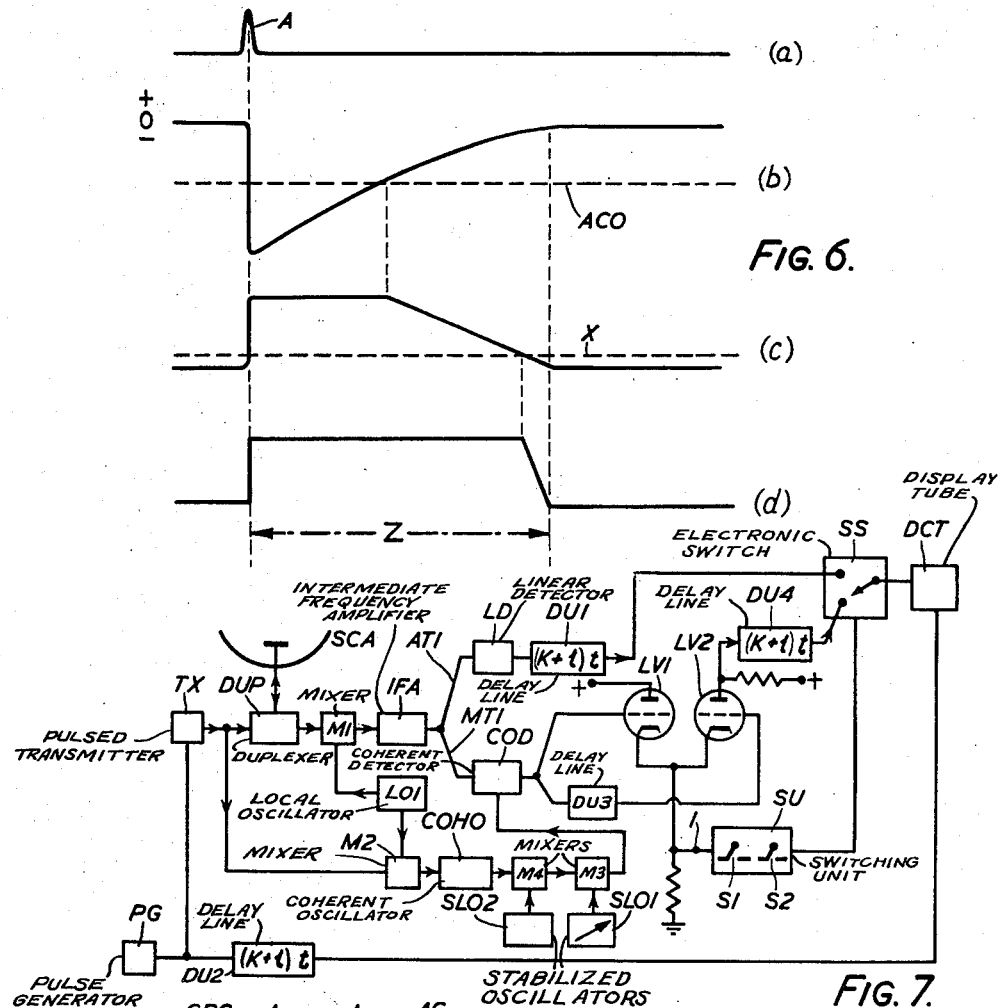
FIG. 6.
FIG. 7.
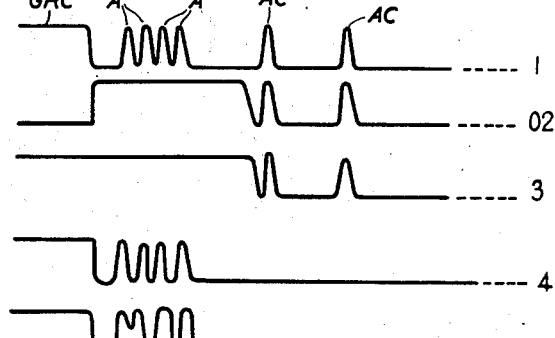
FIG. 8

United States Patent Office 3,121,870
Patented Feb. 18, 1964

3,121,870
PULSED RADAR SYSTEMS
Wilfrid Sinden Mortley, Essex, England, assignor to
The Marconi Company Limited
Filed Mar. 14, 1960, Ser. No. 14,987
Claims priority, application Great Britain Mar. 16, 1959
10 Claims. (Cl. 343—11)

This invention relates to pulsed radar systems. It is applicable to pulsed radar systems generally but is especially useful as applied to so-called surveillance radar systems, i.e. to high power, long range radar systems adapted to provide surveillance over a large area.

Two forms of interference which are particularly apt to confuse the displays of powerful long range radars are those generally known as "clutter" and "angels." "Clutter" is caused by reflections from undesired targets such as rain areas and clouds and manifests itself as fairly large area "paints" in which desired targets, such as aircraft, may be hidden. The cause of "angels" is not known with any certainty, but it is at present commonly believed that they are due to reflections from birds in migrating flocks. "Angels" manifest themselves as point-like "paints" which are commonly very close together over fairly substantial areas of the display screen and which again may mask desired echoes such as those from aircraft.

It is well known to equip radar systems, and especially surveillance radar systems, with means for providing what is known as a moving target indication (M.T.I.) display as well as an ordinary display in which all targets are shown. Strictly speaking an M.T.I. display is one in which the display of fixed targets is eliminated leaving displayed only those targets which have velocity towards or away from the radar station. However, the term "M.T.I. display" is nowadays commonly used (and is used in this specification) to include one in which either fixed targets or targets at some relatively low velocity (such as the velocity of rain clouds) or both are eliminated. Interference and confusion in a display by clutter and angels are obviously much less in the case of an M.T.I. display than in the case of an ordinary display in which all targets are shown and it is known to reduce interference and confusion by equipping radar systems with switch means whereby the operator may switch over from an all target display to M.T.I. display whenever he may choose. This expedient, however, has the important practical defect that the change-over from the one type of display to the other is entirely at the will of the operator and depends upon his judgment, being therefore largely a subjective matter. Operators naturally tend to switch over to M.T.I. display with very little and sometimes no provocation because an M.T.I. display is so much "cleaner" than an all-target display. However, as is also well known, radars operating with M.T.I. display have so-called "blind velocities," i.e. they are unable to display moving targets within certain ranges of velocity, the number and values of these "blind velocities" depending on the general design of the radar. This defect, which is well known and needs no further description or explanation here, can easily result in serious incomplete surveillance and failure to observe possibly important targets at "blind" velocities if an operator, intent on securing a clean and uncluttered display, keeps his M.T.I. display continuously or extensively in use.

There is, therefore, great practical advantage to be obtained from a radar system which will itself determine automatically and in dependence upon clutter and angel interference conditions existing in different parts of the area it surveys, whether the display of those parts shall be M.T.I. or all-target and the present invention seeks to provide such radar systems. As will be seen later, the invention, in its preferred embodiments, provides radar systems which will automatically switch themselves over to M.T.I. display if either clutter or angels be present to a serious extent, M.T.I. display being maintained for as long as, and only for as long as, either or both these forms of interference is or are encountered. In carrying out the invention it is convenient and preferred to provide switch means whereby automatic control by clutter alone or automatic control by angels alone can be obtained when desired.

According to this invention a pulsed radar station comprises means for providing an all-target display of echoes received by said station, means for providing an M.T.I. display of echoes received by said station, and means for automatically rendering the M.T.I. display operative in the presence of received echoes of a predetermined character.

According to a feature of this invention a radar station comprises means for deriving, from received echo signals, signals representative of all targets providing echoes, means for deriving, from received echo signals, signals representative only of targets whose velocity, in relation to the station, are other than a predetermined velocity (which may be zero), a target display unit, and means, responsive to received echoes of a predetermined character, for feeding the latter signals to said display unit when said received echoes of predetermined character are present and for feeding the former signals to said display unit when said received echoes of predetermined character are absent.

The received echoes of predetermined character may be echoes whose pulse length exceeds the transmitted pulse length. If such echoes are used to determine when only moving targets, or targets of other than a predetermined velocity, are displayed the display obtained will be to a large extent free from rain and similar clutter since it is characteristic of such clutter that the received echo pulses are longer than the transmitted pulses.

However, the received echoes of predetermined character may be echoes which, though not of pulse length exceeding the transmitted pulse length, occur one after another with less than a predetermined time interval between successive echoes. If such echoes are used to determine when only moving targets, or targets of other than a predetermined velocity, are displayed, the display obtained will be to a large extent free from angels since it is characteristic of angels that the echoes due thereto are short echoes which are closely spaced in time.

In the preferred embodiments of the invention means are provided for rendering the M.T.I. display operative (i.e. producing a display only of targets which are moving at other than a predetermined velocity) when either echoes of a pulse length exceeding the transmitted pulse length or echoes which occur one after one another with less than a predetermined time interval between them are present. It is convenient, in such embodiments, to provide switch means whereby automatic control of the type of display by received echoes of longer than the transmitted pulse length or by received echoes with less than a predetermined time interval between them or both, may be brought into or out of use as may be desired.

Preferably means (which do not per se form part of this invention) are provided for adjusting to any desired value between zero and a predetermined relatively low velocity, the velocity at which targets are excluded from the display showing only targets of other than said velocity.

The invention is illustrated in and further explained in connection with the accompanying diagrammatic drawings in which FIGURES 1, 2, 3 and 4 show circuits operable in response to the presence of received echoes of pulse length exceeding the transmitted pulse, FIGURE 5 shows a circuit operable in response to the presence either of received echoes of pulse length longer than the transmitted pulses or of received echoes having less than a predetermined time spacing; FIGURE 6 is an explanatory graphical figure explanatory of the operation of the arrangement of FIGURE 5; FIGURE 7 is a simplified diagram of a complete radar station incorporating the invention; and FIGURE 8 is a diagram explanatory of the operation of the arrangement of FIGURE 7 when both switches S1 and S2 are closed. Like references denote like parts throughout.

Referring to FIGURE 1, this shows diagrammatically a very simple form of switching control circuit in accordance with the invention. Referring to this FIGURE 1 positive going signals derived in the ordinary way from the radar receiver proper (not shown) are applied between terminals 1 and 2. The signals from terminal 1 are branched off into two paths one of which includes a delay unit DL giving a delay at least equal to the transmitted pulse length $t$ and preferably rather more than this length, e.g. a delay $Kt$ where $K$ is about 1.5 or 2. The two paths feed into a coincidence detector shown as comprising the two diodes $D_1$ and $D_2$. The output, taken from terminal 4 is employed, by means not shown in FIGURE 1, to effect switching to M.T.I. display when such output is present.

The coincidence detector is such as to give an output only when positive signals exist simultaneously at points 1 and 3. Thus input signals which are shorter than the delay of the unit DL will give no output and input signals which are longer than said delay will give output signals which are shortened by the amount of said delay. If it is required that switching to M.T.I. display be effected for the whole time that clutter is present, the output signals from terminal 4 must be lengthened by an amount at least equal to the delay of unit DL ($Kt$) before being used for switching and the radar signals to be switched must also be delayed at least by this amount ($Kt$). It is sometimes convenient to increase the amount by which the switched signals are delayed by an extra delay of, say, $lt$ (where $l$ is of the order of one half) and to increase the lengthening of the switching signals by about twice this, giving a lengthening of $(K+2l)t$ or more. Any suitable known means may be used for producing the required lengthening of the switching signals from terminal 4 and for delaying the switched signals, FIGURE 2 showing a preferred arrangement for the former purpose.

The left hand part of FIGURE 2 is the same as FIGURE 1 and carries the same references. The pulse stretcher is the part of the circuit between the terminal 4 and the terminal 5 which now supplies signals to operate the switching means (not shown). The said pulse stretcher includes a series diode $D_s$, a signal clamping diode $D_c$ connected between the terminal 5 and a point of predetermined voltage $V_c$, a condenser C across the output terminals 5—2 and a high resistance $R_d$ between the terminal 5 and a suitable negative voltage $V_h$. In this circuit diode $D_s$ will not conduct until the signal potential at point 4 rises above the threshold voltage $V_c$ to which terminal 5 is clamped by the diode $D_c$. Larger input signals will raise the potential at point 4 up to a limited value $V_e$ charging the condenser C through the diode $D_s$. When signals at point 4 cease, condenser C discharges through resistance $R_d$ and reaches the clamping potential $V_c$ by a time given approximately by the expression $$CR_d(V_e - V_c)/V_h$$

If switching is accomplished over a small range of potentials near $V_e$ the timing of the switching will be reasonably accurate for signals near the limit but will be short for smaller amplitude signals. If $V_e$ is not much greater than $V_c$ very few signals will fall between these values and timing errors will be infrequent.

Another method of pulse stretching, having the advantage over the method of FIGURE 2, that it is less dependent on the amplitude of the signals, consists in lengthening the delay unit or line of FIGURE 1 by $(K+2l)t$, connecting coincidence detectors or "and" gates, as they may be called, at every section of the line so that each "and" gate receives two inputs time spaced by $Kt$, and combining the outputs of these gates by a so-called "or" gate, e.g. an arrangement of diodes connected to an output if there is a signal or any one (or more) of the inputs. This arrangement involves the use of rather a large number of diodes, but FIGURE 3 shows a preferred modification enabling an economy to be effected in the number of diodes necessary. In FIGURE 3 the delay line DL is lengthened by an additional delay length DL', the overall length, in the case illustrated, being $5Kt/2$. This overall length is divided into a comparatively few sub-units— as shown five—each $Kt/2$ long. In practice there might be, say, six line sections in each sub-unit in the case of a reasonably low distortion line. Diode coincidence detectors or "and" gates, represented each in FIGURE 3 by a circle with an ampersand in it, are connected to the lengthened line as shown so that the time spacing of the two inputs to each gate is $Kt$, there being, for the illustrated case of five sub-units, four "and" gates. The outputs from the "and" gates are fed as inputs to an "or" gate which is represented by a circle with "OR" in it. The output 4 from the "or" gate will consist of switching signals which will be interrupted if the clutter signals are of duration between $Kt$ and $3Kt/2$, the maximum interruption being of duration $Kt/2$. This possible interruption is bridged to produce uninterrupted switching signals at terminal 5 by inserting an arrangement like that of FIGURE 2 between the points 4 and 5. Since the interruptions to be bridged do not exceed $Kt/2$, the timing accuracy of the arrangement of FIGURE 3 is determined in the main by the extended delay line and to only a relatively small extent by the circuit interposed between points 4 and 5, so that timing is reasonably independent of signal amplitude.

FIGURE 4 illustrates yet another method of pulse stretching between the points 4 and 5, the circuit to the left of point 4 being as in FIGURES 1 and 2 though, in FIGURE 4, the coincidence detector shown as the two diodes $D_1$, $D_2$ in FIGURES 1 and 2 is conventionally represented as an "and" gate. In FIGURE 4 the signal to be stretched is used to charge, through the diodes $D_c$, all the shunt condensers C/2 and C of a low pass filter type of delay line which consists of said condensers and of series inductances L and which is terminated at one end only (the end adjacent point 5) by a resistance equal to twice the electrical length of the delay line. The stretched part of the output signal at point 5 will have, initially, only half the amplitude of the part corresponding to the original signal and will tend to fall to a lower value due to line losses. However, a level amplitude signal suitable for switching can be obtained by amplitude clipping, which is done, in FIGURE 4 by biasing the diodes $D_c$ from a biasing source $V_c$ and providing a further diode $D_e$ which is biased from a voltage source $V_e$ to limit the switching signals (taken from terminal 6) to an output amplitude $V_e$.

The arrangements so far described may be used to switch in M.T.I. display in the presence of clutter such as rain or ground clutter, or indeed any sort of clutter which results in an echo pulse longer than the transmitted pulse but obviously then will not operate to switch in the M.T.I. display in the presence of clutter which does not result in a lengthened echo pulse. In other words the automatic switching arrangements so far described will not operate in response to echoes from undesired targets approximating to point targets. Examples of such undesired targets are so-called "angels." The cause of "angels"—undesired targets of more or less point size commonly seen on the display screens of high power long-range surveillance radars—is not known with certainty, but they are commonly believed to be due to birds and the speeds in relation to ground at which they generally move (anything up to about 80 knots) are consistent with this hypothesis. They may be, and commonly are, so numerous as seriously to confuse the display or a long range radar, hiding important desired targets. The present invention may be used to effect M.T.I. switching in the presence of "angels" as well as, or instead of, effecting such switching as already described.

FIGURE 5 illustrates an arrangement for effecting M.T.I. switching, i.e. switching over to M.T.I. display, in response to the presence of angels. In FIGURE 5 the apparatus for effecting "angel switching" is shown as additional to a "clutter switching" arrangement as shown in FIGURE 1. As will be seen a pulse stretching arrangement is included in series with the input to point 3 which corresponds to the same numbered point in FIGURE 1. This stretching arrangement provides an amount of stretching which is chosen in dependence upon the permissible minimum interval to be allowed between successive angels before automatic switching over to M.T.I. display is to be adopted. For example in a typical practical case in which the duration of a transmitted pulse represented half a mile and the width of the scanning radio beam also represented half a mile it might well be decided to produce automatic switching over to M.T.I. display if the density of angels rose about 0.25 per square mile, i.e. rose to an average spacing of less than 2 miles so that the average linear spacing on any given scan fell below 8 miles. In such a case the pulse stretching arrangement for stretching pulses fed in to point 3 of FIGURE 5 would be arranged to produce a stretch of about 100 micro-seconds (equivalent to 8 miles).

Referring to FIGURE 5, assuming switches $S_1$ and $S_2$ to be closed, input is fed to point 3 over two paths. In the lower path the signal passes through resistance $R_s$ to the grid of a valve V1. The diode $D_t$ in the grid circuit is arranged to operate as a threshold clipper to remove most of the noise and the diode $D_e$, also connected to the grid is provided to limit the signal amplitude if this has not already been done by preceding apparatus (not shown). The valve V1 is a cathode follower which acts as a low impedance source for charging the condenser K which it does through the grid-cathode path of the next valve V2. This path acts as a rectifier. The charging time constant is made short enough for condenser K to be substantially fully charged in one pulse length and it will become charged by any incoming signal of sufficient strength and length. After the end of the signal the grid potential of valve V2 will fall away by approximately the difference in the bias potential on the diodes $D_t$ and $D_e$. The fall in potential will be maintained for a time which is dependent on the time-constant determined by the values of the condenser K and the resistance R in the grid circuit of the valve V2 and also on the positive bias voltage applied through said resistance R. This effect is shown in conventional graphical form in FIGURE 6, line (a) of which represents an angel at A and line (b) of which represents the voltage produced at the grid of valve V2, the anode current cut-off point of valve V2 being also represented in said line (b) at ACO.

The resultant voltage at the anode of V2 is fed via the D.C. blocking condenser $C_b$ to a D.C. restoring diode $D_r$ with which is associated a bias resistance $R_r$ and to a diode $D_{O2}$ which forms part of an "or" gate, the other diode of which is $D_{O1}$. The waveform of the voltage input to the diode $D_{O2}$ (point O2) is shown in line (c) of FIGURE 6 and this is passed to diode $D_2$ of the coincidence detector consisting of the diodes $D_1$ and $D_2$. As long as the signal passed to the diode $D_2$ is equal to or greater than that fed to the diode $D_1$ the latter signal (that fed to diode $D_1$) will be passed on to terminal 4 to cause switching over to M.T.I. display. The broken line X in line (c) of FIGURE 6 is representative of the signal fed to diode $D_1$ and accordingly switching over to M.T.I. display will occur over a fairly well defined interval Z of time as represented in line (d) of FIGURE 6. The apparatus to the right of point 4 of FIGURE 5 is a pulse stretched as in FIGURE 2 and requires no re-description.

The switches $S_1$ and $S_2$ enable the apparatus to be switched over to give M.T.I. display automatically in response either on the occurrence of rain or similar clutter (switch $S_1$ closed) or angels (switch $S_2$ closed) or both (both switches closed) as may be desired. In general switch $S_1$ will be kept closed since rain and similar clutter elimination will usually be wanted though there may be some circumstances, usually temporary, in which it may be desired to display all targets, irrespective of their nature. In practice there will probably be a fair number of occasions in which it will be desired to operate with switch $S_2$ open. For example, since the angel operated apparatus incorporated in FIGURE 5 would, in some circumstances, switch over to M.T.I. display in response to the presence of a number of aircraft flying fairly close together in formation and, if this happened, aircraft targets might be lost due to their falling in one or other of the well known "blind speeds" of M.T.I. presentation, it is desirable to provide the switch $S_2$ to enable "angel switching" to be cut out when desired.

FIGURE 7 is a highly simplified schematic diagram of a complete radar incorporating alternative M.T.I. and all-target display and means for automatically switching over to the former type of display in response to the presence of either rain or similar clutter or angels.

Referring to FIGURE 7, SCA is the usual scanning aerial system which is connected to a pulsed transmitter TX and the first mixer M1 of the receiving portion of the equipment through the usual duplexer DUP. The transmitter is controlled by a pulse generator PG determining the pulse repetition frequency. A stable local oscillator LO1 provides a second input to the mixer M1 and also to a mixer M2 which receives its other input from the transmitter TX. Output from the mixer M1, after amplification by an intermediate frequency amplifier IFA is branched off into two paths, the upper of which, marked AT1 provides signals for all target display (i.e. non M.T.I. display) and the lower of which provides signals for M.T.I. display. The upper path includes a suitable detector, e.g. a linear detector LD, followed by a delay line DU1 providing a delay of $(k+l)t$ and terminates in one input of an electronic switch SS, represented as though it were a mechanical two-way switch and which is actuated automatically to change over from all target display to M.T.I. display, and vice versa, in dependence upon the conditions obtaining at any time. The output from that part of the electronic switch SS equivalent to the armature of a mechanical two-way switch (and represented as such) is taken to the display cathode ray tube DCT whose deflection input obtained as in normal practice, from the pulse generator PG except that a delay line DU2, providing the same delay as the line DU1, is interposed as shown.

The lower path, marked MT1, leads to a coherent detector COD whose second input is obtained from a mixer M3 fed with output from another mixer M4 in turn fed with output from a coherent oscillator COHO entrained by the output from the mixer M2. The mixers M3 and M4 receive their second inputs from stabilised oscillators SLO1 and SLO2 respectively of which the former is shown as variable. The output from the detector COD is branched off into two paths one of which terminates in the control grid of one valve LV1 of a "long tailed pair" and the other of which includes a delay line DU3 giving a delay equal to the pulse repetition period and terminates in the other valve LV2 of said pair. Output from one or both of the valves—as shown from the anode of the valve LV2, is taken to the second input of the switch SS through a delay line DU4 giving the same delay as the line DU1 and DU2.

If the oscillators SLO1 and SLO2 are adjusted to the same frequency (or to frequencies differing by the pulse repetition frequency, or a multiple thereof) and the switch SS is in the position in which it takes signals from valve LV2 to the display tube, the display will be an M.T.I. display with fixed target suppression. By altering the frequency of the oscillator SLO1 to a desired, slightly different, frequency, the M.T.I. display can be made one in which fairly slowly moving targets, moving at a particular velocity corresponding to the extent to which the frequency of oscillator SLO1 is altered, are suppressed. When the switch is moved to its other position in which it takes signals from path AT1 to the display unit, all target display is obtained.

The switch SS is moved to the M.T.I. position by switching signals produced in any of the ways already described by rain or like clutter, or by angels, as may be desired. The switching unit is represented by the block SU in FIGURE 7. It may be, for example, as in FIGURE 5, and this is indicated in FIGURE 7 by showing two switches $S_1$ and $S_2$ on the block which switches are the correspondingly referenced switches of FIGURE 5. Signal input to the terminal 1 of the switching unit SU may be obtained from any of a variety of points in the apparatus—e.g. from the output of the linear detector LD, but it is preferred to take it as shown from the common cathode point of the valves LV1 and LV2 as this gives an improved clutter/noise ratio of operation. When the unit SU provides a switching signal output the electronic switch SS is set to the condition in which an M.T.I. display is given: in the absence of such switching signal output the switch SS is returned to the condition in which an all-target display is given.

FIGURE 8 shows typical waveforms obtained at various points in the arrangement of FIGURE 7 assuming both switches $S_1$ and $S_2$ in the switch unit (assumed to be as in FIGURE 5) closed. The line marked 1 in FIGURE 8 shows signals at the input end of the unit SU—i.e. terminal 1 of FIGURES 5 and 7. Ground or rain clutter appears at GRC; angels appear at A; and aircraft at AC. The line marked O2 shows the signal appearing in the switch unit SU at the point O2 (FIGURE 5); the line marked 3 shows the signal appearing in the switch unit SU at the point 3 (FIGURE 5); the line marked 4 shows the signal appearing in the switch unit SU at the point 4 (FIGURE 5); and the line marked 5 shows the signal appearing at point 5 of FIGURES 5 and 7.

I claim:

1. A pulsed radar station including means for providing an all-target display of echoes received by said station, normally inoperative means for providing an M.T.I. display of echoes received by said station, and means for automatically rendering the M.T.I. display operative in the presence of received echo pulses whose timing is of a predetermined character.

2. A pulsed radar station including means for deriving, from received echo signals, signals representative of all targets providing echoes, means for deriving, from received echo signals, signals representative only of targets whose velocity, in relation to the station, are other than a predetermined velocity (which may be zero), a target display unit, and means, responsive to received echo pulses whose timing is of a predetermined character, for feeding the latter signals to said display unit when said received echo pulses of predetermined character are present and for feeding the former signals to said display unit when said received echo pulses of predetermined character are absent.

3. A station as claimed in claim 1 wherein the received echo pulses whose timing is of predetermined character are echo pulses whose pulse length exceeds the transmitted pulse length.

4. A station as claimed in claim 1 wherein the received echo pulses whose timing is of predetermined character are short echo pulses which occur one after another with less than a predetermined time interval between successive echoes.

5. A station as claimed in claim 1 wherein means are provided for rendering the M.T.I. display operative (i.e. producing a display only of targets which are moving at other than a predetermined velocity) when either echoes of a pulse length exceeding the transmitted pulse length or echoes which occur one after one another with less than a predetermined time interval between them, are present.

6. A station as claimed in claim 5 wherein there is provided switch means adapted and arranged to enable automatic control of the type of display to be effected by received echoes of longer than the transmitted pulse length or by received echoes with less than a predetermined time interval between them or by both at will.

7. A station as claimed in claim 1 and including means for adjusting to any desired value between zero and a predetermined relatively low velocity, the velocity at which targets are excluded from the display showing only targets of other than said velocity.

8. A station as claimed in claim 3 wherein there is provided a coincidence detector, received radar signals being fed through two paths, one of which has a delay time longer than that of the other by an amount at least equal to the transmitted radar pulse length, to the coincidence detector, the latter being adapted to provide an output only when it receives simultaneous inputs over both paths, output signals from said coincidence detector being utilised to switch over automatically to M.T.I. presentation.

9. A station as claimed in claim 8 wherein the output signals from the detector are lengthened by at least the transmitted radar pulse length before being utilised to switch over automatically to M.T.I. presentation.

10. A station as claimed in claim 4 wherein there is provided a condenser having a predetermined charging time constant and a predetermined leakage time constant, received radar signals being employed to charge said condenser, and wherein the charge in said condenser is utilised to determine the point at which automatic switching over to M.T.I. presentation takes place, said time constants being so chosen that said switching over occurs in response to the receipt of a succession of received radar signals with less than a predetermined time interval between them.

References Cited in the file of this patent
UNITED STATES PATENTS
2,597,636    Hall _____ May 20, 1952